United States Patent [19]

Gadeken

[11] Patent Number: 4,570,067

[45] Date of Patent: Feb. 11, 1986

[54] METHOD AND APPARATUS FOR FORMATION LOGGING USING POSITION SENSITIVE NEUTRON DETECTORS

[75] Inventor: Larry L. Gadeken, Houston, Tex.

[73] Assignee: Halliburton Company, Duncan, Okla.

[21] Appl. No.: 658,974

[22] Filed: Oct. 9, 1984

[51] Int. Cl.$^4$ ............................................. G01V 5/00
[52] U.S. Cl. .................................... 250/266; 250/269
[58] Field of Search ........................ 250/256, 266, 269

[56] References Cited

U.S. PATENT DOCUMENTS

| | | | |
|---|---|---|---|
| 3,906,224 | 9/1975 | Scott et al. | 250/266 |
| 4,005,290 | 1/1977 | Allen | 250/266 |
| 4,035,639 | 7/1977 | Boutemy et al. | 250/266 |
| 4,379,228 | 4/1983 | Allen | 250/266 |

*Primary Examiner*—Janice A. Howell
*Attorney, Agent, or Firm*—W. J. Beard

[57] ABSTRACT

One or more position sensitive neutron detectors in a borehole logging tool provide for making dual-porosity dual-spaced neutron porosity logs with fewer detectors and a more compact tool, by separately detecting both thermal and epithermal neutrons in a single detector. The position sensitivity also provides for determining, with a single neutron detector, particular neutron characteristic lengths in the earth formations being logged.

15 Claims, 2 Drawing Figures

FIG.2 LOGARITHMIC DERIVATIVE OF FLUX VS. INVERSE DISTANCE

METHOD AND APPARATUS FOR FORMATION LOGGING USING POSITION SENSITIVE NEUTRON DETECTORS

BACKGROUND OF THE INVENTION

The present invention relates to radiological well logging methods and apparatus for investigating the characteristics of subsurface earth formations traversed by a borehole. More particularly, the invention relates to methods and apparatus for measuring porosities and other properties of earth formations in the vicinity of a well borehole by means of neutron well logging techniques.

In the search for liquid hydrocarbons beneath the earth's crust, one of the parameters which must be known about the earth formation is its porosity. The porosity, or fractional volume of fluid filled pore space present around the rock grains comprising the earth formation, is needed both to evaluate the formation's commercial production potential, and also to assist in the interpretation of other logs, such as resisitivity and pulsed neutron logs.

Several techniques have been developed in the prior art to measure earth formation porosity in a borehole environment. One such technique employs a gamma ray source and single, or multiple, detectors to measure the electron density of the earth formations by the amount of gamma ray scattering. Another technique employs an acoustic transmitter and one or more acoustic receivers. The velocity of compressional wave acoustic transmission through the formation from the acoustic transmitter to the receivers is measured and may be directly related to the formation porosity.

A third commercial technique which has been employed in the prior art to measure the porosity of earth formations employs a neutron source and any of several types of neutron or gamma ray detectors. Because the behavior and interactions of neutrons with matter are quite distinct depending upon their energies, neutron populations are generally divided into at least three distinct energy ranges: fast, epithermal, and thermal. Generally speaking, fast neutrons are those with energies around one MeV (within an order of magnitude or so). Epithermal neutrons have energies around one ev. Thermal neutrons are in thermal equilibrium with their environment and have energies around 0.025 ev. Generally, slower moving or less energetic neutrons are more easily captured by the nuclei of materials in the earth formation. Once such neutrons are captured, these nuclei then decay to lower energy states by the emission of energy-characteristic gamma rays.

The neutron sources commonly employed all emit neutrons in the fast energy range, and depending upon the formation constituents into which the neutrons are emitted, these energies will then be attenuated at various rates by interactions with the matter in the formation. Generally speaking, hydrogen is the agent most effective for slowing down neutrons in an earth formation. Hydrogen in the form of water or hydrocarbons is found in the pore spaces of the formation rocks.

A common neutron porosity logging technique is one which employs either a neutron or gamma ray detector which is sensitive to the density of the thermalized neutrons at some point removed from the neutron source. Then, in a formation containing a larger amount of hydrogen than is present in low porosity formations, the neutron distribution is more rapidly slowed down, and is contained in the area of the formation near the source. Therefore, the counting rates in remote thermal neutron sensitive detectors located several inches or more from the source will be suppressed. In lower porosity formations which contain little hydrogen, the source neutrons are able to penetrate farther. Hence, the counting rates in the more remote detector or detectors are increased. This behavior may be directly quantified into a measurement of the porosity by well established procedures.

One of the most common criticisms of neutron well logging is that it is too sensitive to the borehole and the borehole environment. Thus the response of neutron logs, especially thermal neutron logs, is affected by such factors as diameter irregularities of the borehole wall, mudcake irregularities in open-hole logging, irregularities in the cement annulus surrounding the casing in a cased well borehole, the properties of different types of steel casings in cased wells, variations in the properties of different borehole fluids (especially the chlorine content of the fluid, since chlorine has a high absorption cross-section for thermal neutrons), the various different formation lithologies which surround the borehole, the position of the logging instrument in the borehole, and so forth.

A well-known neutron logging method which has been commercially available for many years and which provides good compensation for many of these limitations is the so-called dual-spaced neutron log. (See L. S. Allen, et al., "Dual-Spaced Neutron Logging for Porosity", Geophysics, Vol. 32, February, 1967.) In such a log, the thermal neutron fluxes at two different distances from a source of fast neutrons are measured and the ratio of these flux measurements is taken. This effectively reduces the effects of such factors as eccentricity of location of the logging tool in the borehole, variations in salinity of the liquid in the borehole, variations in salinity of the liquid in the formation, uncertainties in the borehole size, and so forth.

An alternative to measuring porosity with thermal neutrons is to determine porosity from epithermal neutron measurements. Such measurements are advantageous because they are much less sensitive to thermal neutron absorbers. However, due to lower flux rates, they have the statistical disadvantage of furnishing much lower count rates.

A commercially available enhancement to the dual-spaced neutron log, considered of value in certain logging environments, is the so-called dual-porosity dual-spaced neutron log. (See R. R. Davis, et al., "A Dual Porosity CNL Logging System", SPE Paper #10296, October, 1981.) Such a logging method adds a pair of epithermal neutron detectors to the thermal neutron detector pair. Ratios or other data processing techniques are then employed to exploit the insensitivity of epithermal neutrons to the presence of thermal neutron absorbers (elements with large thermal neutron capture cross-sections) such as chlorine. The two separate porosity measurements (thermal and epithermal) which are obtained can then be compared to provide additional information about the formation, such as clay content, gas detection in shaly gas sands, and so forth. Sometimes inferences can also be drawn concerning formation lithology and salinity, especially when the data can be cross-correlated with data from other logs.

An obvious physical disadvantage of tools for performing the dual-porosity dual-spaced neutron log is their excessive physical length. This can pose a problem particularly where several tools are strung together to provide multiple well logging services on the same borehole pass. At the least, this results in greater tool standoff in rugose boreholes. Also, measurements of the epithermal neutron slowing down rate in such tools are conventionally based upon the same data from which the other (e.g., porosity) measurements are drawn. Not only does this require the use of plural detectors, but since the same basic data is used for both (porosity and slowing down length) measurements, these results are necessarily interrelated. If it were possible to derive them simultaneously yet independently in a logging run, while using the same detectors for both, then cross correlations with this or other measurement data could be significantly more valuable.

A need therefore exists for an improved method and apparatus for formation logging in which such logs as dual-porosity dual-spaced neutron logs can be performed more compactly than possible with present tools using four separate neutron detectors. A need also remains for increasing the raw data obtained with this or similar such tools by measuring and determining characteristic neutron lengths, such as the epithermal neutron slowing down length, independently of, or in addition to, such other measurements. Preferably this should be done with the same neutron detectors which are being used for the porosity measurements, and ideally with as little as a single neutron detector.

SUMMARY OF THE INVENTION

Briefly, the present invention meets the above needs and purposes with a method and apparatus for formation logging using position sensitive neutron detectors. More particularly, the present invention provides for neutron porosity measurements of the dual-porosity dual-spaced type which, by using position sensitive detectors, can be performed with fewer than four detectors (preferably two, and potentially with only one). The logging tool can therefore be a more compact logging tool than when four entirely separate neutron detectors are used. The invention also provides for simultaneously determining characteristic neutron lengths using any one of the position sensitive neutron detectors, a measurement which, while made with the same neutron detector(s), is independent from and in addition to the dual-porosity dual-spaced measurements.

To accomplish the above, each detector in the preferred embodiment is position sensitive. That is, each time a neutron event is detected within the detector, the location or position of the event within the detector is also detected. As taught in the present invention, it is thus possible to use the same single detector to count both thermal and epithermal neutrons within a particular detector located within the tool. One such detector will therefore be located at a first predetermined spaced distance from the neutron source in the tool, and another detector at a greater spaced distance. When positioned in a well borehole, so that the source of fast neutrons irradiates the earth formations in the vicinity of the well borehole, the two detectors respectively form the near and far detectors for both the thermal and the epithermal neutron populations.

In the preferred embodiment, the position sensitive neutron detectors are $He^3$ proportional counters which are intrinsically sensitive to both thermal and epithermal neutrons. A portion of each detector is then made substantially thermally insensitive by surrounding each such portion with a thermal neutron shielding material such as a cadmium sheet. The percentage of the length of each detector which is surrounded with the thermal neutron shielding material, and thus made primarily epithermally sensitive, can thereby be easily controlled according to the specific needs of the application at hand.

The ends of each detector nearest the neutron source are preferably the detector portions which are surrounded with the cadmium sheet. This helps maximize the epithermal counts since the epithermal flux is typically less, by a factor of ten or more, than the thermal flux. Therefore, the first epithermal detector (which is the corresponding portion of the first position sensitive neutron detector) is located at an effective first spaced distance from the neutron source in the borehole. The first thermal detector (which is the corresponding portion of the same first position sensitive neutron detector) is located at an effective second spaced distance from the neutron source in the borehole, slightly greater than the first distance. Likewise, the second epithermal detector (which is the corresponding portion of the second position sensitive neutron detector) is located at an effective third spaced distance from the neutron source in the borehole. Correspondingly, the second thermal detector (which is the corresponding portion of the same second position sensitive neutron detector) is located at an effective fourth spaced distance from the neutron source in the borehole, slightly greater than the third distance.

As the neutrons are detected, corresponding first, second, third, and fourth signals are generated which are representative of the epithermal and thermal neutron populations which are detected, as described, at the first, second, third, and fourth spaced distances. These signals are then combined, using any of the well known methods used in dual-porosity dual-spaced neutron logging, to derive a measurement signal functionally related to the porosity of the earth formations in the vicinity of the borehole. As indicated, the invention thus provides for performing such formation logging with a shorter and more compact logging tool than would obtain or could be done with the use, as in the prior art, of four entirely separate neutron detectors.

Due to the use of the position sensitive neutron detectors, the present invention also provides for simultaneously measuring and determining characteristic neutron lengths, such as the epithermal neutron slowing down length or the thermal neutron diffusion length, in the adjacent earth formations, while using the same detectors used for the dual-porosity dual-spaced measurements described above. Although the measurements are made with the same neutron detectors, the characteristic neutron length measurements which result are independent from and in addition to the dual-porosity dual-spaced measurements. This additional independent characteristic neutron length data can then be cross-correlated with the simultaneously obtained porosity data, or with other measurement data, as desired. In fact, the characteristic neutron length measurements can be performed with as little as a single neutron detector. The invention therefore also makes it possible to simultaneously and independently determine characteristic neutron lengths whether or not dual-spaced measurements are being made.

In making the characteristic neutron length measurements, the preferred embodiment of the invention again employs a $He^3$ position sensitive proportional neutron detector located at a predetermined spaced distance from the fast neutron source in the borehole. The spatial flux distribution N(r) of the neutrons of interest is then detected as a function of the distance from the neutron source. Signals are then generated which represent the detected neutron populations and their distances from the neutron source. These representative signals are then combined to derive a measurement signal which is functionally related to the particular characteristic neutron length of interest in the earth formation being irradiated. In the preferred embodiment, the neutron population and distance representative signals are combined by fitting the spatial flux distribution data to an equation of the form y=ax+b, and solving for a particular characteristic neutron length L by relating the equation to the first spatial derivative of the spatial flux distribution. Due to the position sensitivity of the neutron detector, the first spatial derivative of the spatial flux distribution is a directly measured quantity. Then the earth formation lithology can be characterised by relating the particular characteristic neutron length L which has been determined to the corresponding neutron diffusion constant D according to the equation $L^2 = D/\Sigma$, where $\Sigma$ is the corresponding macroscopic cross section of the formation.

It is therefore a feature of the present invention to provide an improved method and apparatus for formation logging; such a method and apparatus which uses position sensitive neutron detectors; which, by using such position sensitive neutron detectors, provides for neutron porosity measurements of the dual-porosity dual-spaced type which can be performed with fewer than four neutron detectors; which can therefore be performed with a more compact logging tool than when four entirely separate neutron detectors are used; which also provides for simultaneously determining characteristic neutron lengths using any one of the position sensitive neutron detectors; which, while using the same neutron detector(s), makes the characteristic neutron length measurements independently from and in addition to the dual-porosity dual-spaced measurements; which, accordingly, irradiates earth formations in the vicinity of a well borehole with a source of fast neutrons; which, at a first predetermined spaced distance from the neutron source in the borehole, detects the epithermal neutron population in an epithermally sensitive and substantially thermally insensitive portion of a position sensitive neutron detector; which then generates first signals representative of the detected epithermal neutron population at the first distance; which, at a second predetermined spaced distance from the neutron source in the borehole, detects the thermal neutron population in a thermally sensitive portion of the same position sensitive neutron detector; which generates second signals representative of the detected thermal neutron population at the second distance; which, at a third predetermined spaced distance from the neutron source in the borehole, different from the first distance, detects the epithermal neutron population in an epithermally sensitive and substantially thermally insensitive neutron detector; which generates third signals representative of the detected epithermal neutron population at the third distance; which, at a fourth predetermined spaced distance from the neutron source in the borehole, different from the second distance, detects the thermal neutron population in a thermally sensitive neutron detector; which generates fourth signals representative of the detected thermal neutron population at the fourth distance; which combines the first, second, third, and fourth neutron population representative signals to derive a measurement signal functionally related to the porosity of the earth formations in the vicinity of the borehole; which can also, in a position sensitive neutron detector located at a predetermined spaced distance from the neutron source in the borehole, detect the neutron spatial flux distribution N(r) in a predetermined energy range; in which the spatial flux distribution N(r) represents the neutron populations in that energy range as a function of the distance from the neutron source; which generates signals representative of the detected neutron populations and their distances from the neutron source; which combines the neutron population and distance representative signals to derive a measurement signal functionally related to a particular characteristic neutron length in the earth formation being irradiated; which thereby provides for performing such formation logging with a more compact logging tool than would obtain with the use of four entirely separate neutron detectors; which thereby provides for performing such measurements and for determining the particular characteristic neutron length with as little as a single neutron detector; and to accomplish the above features and purposes in an uncomplicated, versatile, accurate, inexpensive, and reliable method and apparatus readily suited to utilization in the widest possible earth formation neutron logging applications.

Other features and advantages of the invention will be apparent from the following description, the accompanying drawings and the appended claims.

BRIEF DESCRIPTION OF THE DRAWINGS

FIG. 2 is a graphical illustration of one method of determining characteristic neutron lengths from the spatial flux distribution data.

DESCRIPTION OF THE PREFERRED EMBODIMENTS

Figure 1:
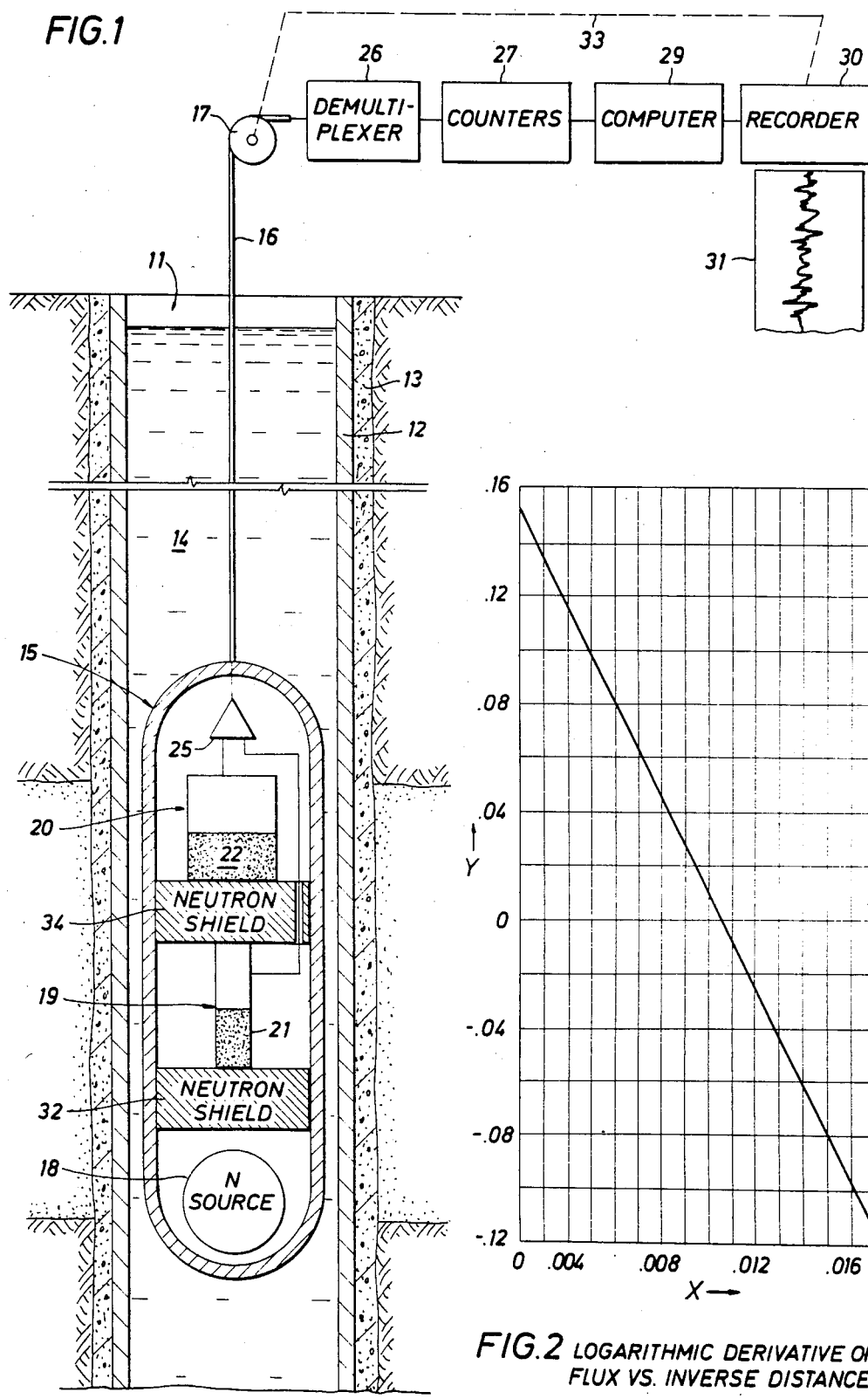
FIG. 1 is a schematic illustration showing a well logging system according to the principles of the present invention.

With reference to the drawings, the new and improved method and apparatus for earth formation logging using position sensitive neutron detectors will be described. FIG. 1 shows a simplified schematic functional representation of a well logging apparatus in accordance with the present invention. A well borehole 11 which penetrates several earth formations is lined with a steel casing 12 and filled with a well fluid 14. The steel casing 12 may be cemented in place by cement layer 13, which also serves to prevent fluid communication between adjacent producing formations in the earth.

The downhole portion of the logging system may be seen to comprise an elongated, fluid tight, hollow body member or sonde 15 which is sized for passage through the casing 12, and during the logging operation is passed longitudinally therethrough. Surface instrumentation, whose function will be discussed in more detail subsequently, is shown for processing and recording electrical measurements provided by the sonde 15.

A well logging cable 16 passes over a sheave wheel 17 and supports the sonde 15 in the borehole 11. Cable 16 also provides a communication path for electrical signals to and from the surface equipment and the sonde 15. The well logging cable 16 may be of conventional armored cable design and may have one or more electrical conductors for transmitting such signals between the sonde 15 and the surface instrumentation apparatus.

Again referring to FIG. 1, the sonde 15 contains, at its lower end, a neutron source 18. This neutron source may comprise a typical continuous chemical neutron source such as actinium-berylium, Californium 252, or Americium-berylium. Alternatively, a 14 MeV deuterium-tritium accelerator type neutron source, which produces essentially monoenergetic 14 MeV neutrons, may be used, as in a continuous operation mode, if desired, according to the concepts of the present invention.

Two position sensitive radiation detectors, near detector 19 and far detector 20, are provided in the downhole sonde 15. (A suitable position sensitive detector is described, for example, in U.S. application Ser. No. 571,973, filed Jan. 18, 1984, entitled *Gamma Ray Measurement of Earth Formation Properties Using a Position Sensitive Scintillation Detector* (Darrell Sonne), and assigned to the assignee of the present invention.) Detectors 19 and 20 are separated from the neutron source 18 by a neutron shielding material 32, and from each other by a neutron shielding material 34. The neutron shields 32 and 34 ensure that there is not a transmission path for source neutrons along the length of the tool, and that there is minimal "crosstalk" between the neutron detectors 19 and 20. The neutron shields 32 and 34 may comprise any material which serves to effectively slow down and shield detectors 19 and 20 from direct neutron irradiation by the neutron source 18. Any suitably highly hydrogenous material, such as paraffin or hydrocarbon polymer plastic for example, may be used for this purpose. (The shielding, while preferred, is not absolutely necessary in all circumstances, and may be omitted where appropriate.)

Detectors 19 and 20, in the preferred embodiment, are position sensitive neutron detectors of a known $He^3$ proportional counter type. Detectors 19 and 20 are thus intrinsically sensitive to both epithermal and thermal neutrons. The lower halves 19a and 20a of detectors 19 and 20 are then each surrounded by respective cadmium sheets or foils 21 and 22, which serve as thermal neutron shielding material for their respective detector portions 19a and 20a. Of course, excellent thermal neutron absorbers other than cadmium sheets may also be used, as appropriate or desired. The cadmium sheets 21 and 22 render their respective detector portions 19a and 20a substantially thermally insensitive, but portions 19a and 20a still remain epithermally sensitive-that is, sensitive to the detection of epithermal neutrons. The detectors 19 and 20 are each therefore able to separately detect and identify epithermal and thermal neutrons, depending upon in which end of the detector the neutron event is detected. Since the epithermal flux is less by a factor of ten or more than the thermal flux, the epithermal counts are maximized by placing the epithermal detector portions 19a and 20a nearest to the neutron source 18. Of course, the actual percentage of the length of each detector which is made epithermally sensitive may vary from application to application and from one particular device design to another.

Since detectors 19 and 20 are position sensitive, each detector detects the locations within the detector where the neutron events have occurred, as well as the number of such events. The detectors therefore detect the neutron spatial flux distributions N(r) as a function of the distance from the neutron source. These appear as electrical signals which are amplified in amplifier and multiplexer 25 for transmission via conductors in cable 16 to a surface demultiplexer circuit 26. Output signals from the demultiplexer circuit 26 comprise signals representative of the spatial flux distributions N(r) of the neutrons in the vicinity of the detectors. These neutron signals may then be supplied to a suitably programmed computer 29 for processing the data, as further described below. The output signal from computer 29 is then supplied to a data recorder 30 which may be of the typical strip chart or film recorder type used in well logging. The recorder 30 provides an output trace of the output signal on a record medium 31 as a function of borehole depth. The depth information is obtained, in a conventional manner known in the art, by mechanically or electrically coupling the recorder 30 to the sheave wheel 17, as indicated by the dotted line 33 of FIG. 1.

In the preferred embodiment, two detectors 19 and 20 are used. A particular advantage in using two separate detectors is that the sizes and counting efficiencies can be tailored individually for each spacing from the neutron source 18. Thus, as illustrated, the near detector 19 can be short, have a small diameter, and have a low gas pressure, since there is not a count rate problem close to the source. The far counter 20, on the other hand, can be a long, large diameter, high pressure detector for maximum sensitivity, in order to minimize counting statistics.

Alternatively, a single detector could be used for all four measurements, by wrapping two bands of cadmium sheet around such a single detector, for example, and thus dividing it into four distinct spaced portions. Of course, unless the detector is itself of considerable length, much of the value of dual-spaced detection could be lost due to the closeness of the thermal detection zones to one another, and the similar closeness to one another of the epithermal detection zones.

The dual observation of epithermal and thermal neutrons allows the formation capture cross section $\Sigma$ to be determined. (See L. S. Allen, supra.) Additionally, characteristic neutron lengths, such as the epithermal neutron slowing down length $L_e$ or the thermal neutron diffusion length $L_t$, can be measured by taking advantage of the positional information provided by any of the position sensitive neutron detectors. (The data from a single detector is sufficient.) This may be seen as follows. The epithermal neutron flux can be approximated at large distances from the source by:

$$N_e(r) = (k/r) e^{-r/L_e} \quad (1)$$

where $N_e$ is the neutron flux, r is the distance from the neutron source, and k is a constant. The first spatial derivative of equation (1) is:

$$\frac{dN(r)}{dr} = \frac{-k}{r} e^{-r/L_e} \left( \frac{1}{r} + \frac{1}{L_e} \right) \quad (2)$$

$$= -N \left( \frac{1}{r} + \frac{1}{L_e} \right)$$

This relation suggests that it is appropriate to investigate the functional form of the logarithmic derivative $$y = \frac{-dN/dr}{N} \quad (3)$$

versus $x=1/r$. Equation (2) indicates that y varies linearly with x, and that the y intercept is inversely proportional to L. This in turn suggests that a linear equation $$y = ax + b \quad (4)$$

can be used as a means of processing position sensitive data, since L and the y intercept $b=1/L$ can be related to the thermal diffusion length $L_t$, the epithermal slowing down length $L_e$, or the migration length $L_m$. Equation (4) can thus be a good approximation for any of these.

To illustrate this further, here is a table of some characteristic neutron lengths for various materials. ($L_m$, the neutron migration length, is approximately equal to $\sqrt{L_e^2 + L_t^2}$.)

| Table of Various Characteristic Neutron Lengths | | | | |
|---|---|---|---|---|
| MINERAL | $\rho_G$ | $L_e$ | $L_t$ | $L_m$ | FORMULA |
| Water | 1.00 | 7.768 | 2.835 | 8.286 | $H_2O$ |
| Salt Water | 1.15 | 7.887 | 1.342 | 8.020 | $H_2O$ + 200k ppm NaCl |
| Oil | 0.85 | 6.553 | 2.313 | 6.961 | $C_{12}H_{26}$ |
| Kaolinite | 2.44 | 10.396 | 5.525 | 11.831 | $Al_4Si_4O_{10}(OH)_8$ |
| Chlorite | 2.77 | 14.411 | 4.233 | 15.147 | $(Mg, Fe, Al)_6(Si, Al)_4O_{10}(OH)_8$ |
| Illite | 2.53 | 15.673 | 7.430 | 17.528 | $K_{1.25}Al_4(Si_{6.75}, Al_{1.25})O_{20}(OH)_4$ |
| Montmorillonite | 2.12 | 16.748 | 5.973 | 17.912 | $(Ca, Na)_{0.7}(Al, Mg, Fe)_4(Si, Al)_8O_{20}(OH)_4(H_2O)_4$ |
| Glauconite | 2.53 | 13.239 | 5.415 | 14.417 | $K_2(Mg, Fe)_2Al_6(Si_4O_{10})_3(OH)_{12}$ |
| Quartz | 2.65 | 29.266 | 16.70 | 36.887 | $SiO_2$ |
| Garnet | 4.32 | 20.145 | 3.866 | 22.359 | $Fe_3Al_2(SiO_4)_3$ |
| Halite | 2.17 | 36.603 | 0.631 | 39.280 | NaCl |
| Anhydrite | 2.96 | 29.811 | 9.575 | 33.972 | $CaSO_4$ |
| Sylvite | 1.98 | 54.94 | 0.857 | 59.417 | KCl |
| Sulphur | 2.07 | 208.44 | 16.09 | 236.85 | S |
| Bituminous Coal | 1.27 | 7.649 | 3.962 | 8.645 | $CH_{.793}N_{.015}O_{.078}$ |
| Calcite | 2.71 | 23.299 | 11.73 | 28.025 | $CaCO_3$ |
| Dolomite | 2.87 | 20.161 | 13.61 | 25.903 | $CaCO_3MgCO_3$ |
| Anorthocase | 2.62 | 33.649 | 9.117 | 38.058 | $KAlSi_3O_8$ |

FIG. 2 gives a graphical solution to a computer simulation, in which the data was plotted and yielded a line having the equation $y = -18.3x + 0.156$. This gives the result $L_M = 6.4$ cm., which differs from the total migration length (epithermal plus thermal), partially due to borehole effects, and gives good prospects of being able to functionally relate the various characteristic lengths. In fact, somewhat unexpectedly it has been found empirically that the above solutions can be used with good results for both thermal and epithermal data.

The availability of a measurement of dN/dr, in addition to the usual N, makes it possible to characterize the formation lithology, particularly if the data can be cross-correlated with other data. For example, this can be done by relating the epithermal neutron slowing down length $L_e$ which has been determined to the corresponding neutron diffusion constant D according to the equation $L_e^2 = D/\Sigma$, where $\Sigma$ is the corresponding macroscopic cross section of the formation. This lithology parameter can be very valuable since it will not be seriously compromised by the presence of high Z materials in the borehole, such as barite mud or iron casing.

Also, in non-standard lithologies (e.g., where clays or shales are present) it is valuable to have some indication when L is changing. This data will therefore be very useful in a number of ways in such analyzes, as will be readily apparent to those skilled in the art.

As may be seen, therefore, the present invention provides numerous advantages. Principally, it provides for performing earth formation logging, such as dual-porosity dual-spaced logs, with a more compact logging tool than previously possible. It also provides for simultaneously yet independently measuring characteristic neutron lengths, thus providing valuable information about the lithology of the formations. These advantages are afforded by using one or more position sensitive neutron detectors for detecting the neutron spatial flux distribution as a function of the distance from the neutron source. In use, therefore, the invention is highly versatile and can readily be combined with many other measurements and tools for increasing the amount of useful data which can be derived therefrom. It is uncomplicated, inexpensive, reliable, and readily suited to utilization in the widest possible earth formation measurement applications.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:
1. A method for logging earth formations using position sensitive neutron detectors, comprising:
   (a) irradiating earth formations in the vicinity of a well borehole with a source of fast neutrons,
   (b) at a first longitudinally spaced distance from the neutron source in the borehole, detecting the epithermal neutron population in an epithermally sensitive and substantially thermally insensitive portion of a single position sensitive neutron detector, and generating a first signal representative thereof,
   (c) at a second longitudinally spaced distance from the neutron source in the borehole, detecting the thermal neutron population in a thermally sensitive portion of the same position sensitive neutron detector, and generating a second signal representative thereof,
   (d) at a third longitudinally spaced distance from the neutron source in the borehole, different from said first distance, detecting the epithermal neutron population in an epithermally sensitive and substantially thermally insensitive neutron detector, and generating a third signal representative thereof,
   (e) at a fourth longitudinally spaced distance from the neutron source in the borehole, different from said second distance, detecting the thermal neutron population in a thermally sensitive neutron detector, and generating a fourth signal representative thereof, and
   (f) combining said first, second, third, and fourth neutron population representative signals to derive simultaneously a measurement signal functionally related to the porosity and a signal functionally related to a neutron characteristic length of the earth formations in the vicinity of the borehole.
2. The method of claim 1 wherein the steps of detecting the epithermal and the thermal neutron populations at said third and fourth spaced distances are both per- formed together in a single position sensitive neutron detector.

3. The method of claim 2 wherein one position sensitive neutron detector is used for the measurements at the first and second distances, and another position sensitive neutron detector is used for the measurements at the third and fourth distances.

4. The method of claim 2 wherein a single position sensitive neutron detector is used for all four measurements.

5. The method of claim 1 wherein the earth formations are irradiated with a continuous source of fast neutrons.

6. A method for logging earth formations using position sensitive neutron detectors, comprising:
  (a) irradiating earth formations in the vicinity of a well borehole with a continuous source of fast neutrons,
  (b) at a first predetermined spaced distance from the neutron source in the borehole, detecting the epithermal neutron population in an epithermally sensitive and substantially thermally insensitive portion of a first position sensitive neutron detector, the first position sensitive neutron detector being a $He^3$ proportional counter which is intrinsically sensitive to both epithermal and thermal neutrons and has the substantially thermally insensitive portion thereof surrounded by a cadmium sheet,
  (c) generating first signals representative of the detected epithermal neutron population at the first distance,
  (d) at a second predetermined spaced distance from the neutron source in the borehole, greater than the first distance, detecting the thermal neutron population in a thermally sensitive portion of the first position sensitive neutron detector,
  (e) generating second signals representative of the detected thermal neutron population at the second distance,
  (f) at a third predetermined spaced distance from the neutron source in the borehole, greater than the second distance, detecting the epithermal neutron population in an epithermally sensitive and substantially thermally insensitive portion of a second position sensitive neutron detector, the second position sensitive neutron detector also being a $He^3$ proportional counter which is intrinsically sensitive to both epithermal and thermal neutrons and has the substantially thermally insensitive portion thereof surrounded by a cadmium sheet,
  (g) generating third signals representative of the detected epithermal neutron population at the third distance,
  (h) at a fourth predetermined spaced distance from the neutron source in the borehole, greater than the third distance, detecting the thermal neutron population in a thermally sensitive portion of the second position sensitive neutron detector,
  (i) generating fourth signals representative of the detected thermal neutron population at the fourth distance, and
  (j) combining the first, second, third, and fourth neutron population representative signals to derive a measurement signal functionally related to the porosity of the earth formations in the vicinity of the borehole, the method thereby providing for performing such formation logging with a shorter and more compact logging tool than would obtain with the use of four entirely separate neutron detectors.

7. A method for measuring characteristic neutron lengths in earth formations, comprising:
  (a) irradiating an earth formation in the vicinity of a well borehole with a source of fast neutrons,
  (b) in a position sensitive neutron detector located at a predetermined spaced distance from the neutron source in the borehole, detecting the neutron spatial flux distribution N(r) in a predetermined energy range, the spatial flux distribution representing the neutron populations in that energy range as a function of the distance from the neutron source,
  (c) generating signals representative of the detected neutron populations and their distances from the neutron source, and
  (d) combining the neutron population and distance representative signals to derive a measurement signal functionally related to a particular characteristic neutron length in the earth formation being irradiated, the method thereby providing for performing such measurements and determining the particular characteristic neutron length with as little as a single neutron detector.

8. The method of claim 7 wherein the predetermined energy range is the epithermal neutron energy range, and the particular characteristic neutron length is the epithermal neutron slowing down length.

9. The method of claim 7 wherein the predetermined energy range is the thermal neutron energy range, and the particular characteristic neutron length is the thermal neutron diffusion length.

10. The method of claim 7 wherein the step of combining the neutron population and distance representative signals further comprises fitting the spatial flux distribution data to an equation of the form $y = ax + b$, and solving for a particular characteristic neutron length L, by relating the equation $y = ax + b$ to the first spatial derivative of the spatial flux distribution $$\frac{dN(r)}{dr} = -N\left(\frac{1}{r} + \frac{1}{L}\right)$$

as follows:

$$y = \frac{-dN/dr}{N},\ ax = \frac{1}{r},\ b = \frac{1}{L}.$$

11. The method of claim 10 wherein the predetermined energy range is the epithermal neutron energy range, N is the epithermal neutron flux, and L is $L_e$, the epithermal neutron slowing down length.

12. The method of claim 7 further comprising characterising the formation lithology by relating the particular characteristic neutron length L which has been determined to the corresponding neutron diffusion constant D according to the equation:

$$L^2 = D/\Sigma$$

where $\Sigma$ is the corresponding macroscopic cross section of the formation.

13. The method of claim 7 wherein the position sensitive neutron detector is a $He^3$ proportional counter.

14. The method of claim 7 wherein the earth formations are irradiated with a continuous source of fast neutrons.

15. A method for measuring epithermal neutron slowing down lengths in earth formations, comprising:
(a) irradiating an earth formation in the vicinity of a well borehole with a continuous source of fast neutrons,
(b) in a He$^3$ position sensitive neutron detector located at a predetermined spaced distance from the neutron source in the borehole, detecting the epithermal neutron spatial flux distribution $N_e(r)$, the epithermal neutron spatial flux distribution representing the epithermal neutron population as a function of the distance from the neutron source,
(c) generating signals representative of the detected epithermal neutron populations and their distances from the neutron source,
(d) combining the epithermal neutron population and distance representative signals to derive a measurement signal functionally related to the epithermal neutron slowing down length $L_e$ in the earth formation being irradiated, by fitting the spatial flux distribution data to an equation of the form $y = ax + b$, and solving for the epithermal neutron slowing down length $L_e$, by relating the equation $y = ax + b$ to the first spatial derivative of the spatial flux distribution $$\frac{dN(r)}{dr} = -N\left(\frac{1}{r} + \frac{1}{L_e}\right)$$

as follows:

$$y = \frac{-dN/dr}{N}, \quad ax = \frac{1}{r}, \quad b = \frac{1}{L_e},$$

and
(e) characterising the formation lithology by relating the epithermal neutron slowing down length $L_e$ which has been determined to the corresponding neutron diffusion constant D according to the equation:

$$L_e^2 = D/\Sigma$$

where $\Sigma$ is the corresponding macroscopic cross section of the formation, the method thereby providing for performing such measurements and determining the epithermal neutron slowing down length with as little as a single neutron detector.

* * * * *